(12) United States Patent
Kettels (10) Patent No.: US 9,828,802 B2
(45) Date of Patent: Nov. 28, 2017

(54) FLUID PULSE DRILLING TOOL

(71) Applicant: H.P.H.T. Drilling Tools Pty. Ltd., Salisbury North (AU)

(72) Inventor: Trevor David Kettels, Raymond Island (AU)

(73) Assignee: SJM Designs Pty Ltd. (AU)

(*) Notice: Subject to any disclaimer, the term of this patent is extended or adjusted under 35 U.S.C. 154(b) by 385 days.

(21) Appl. No.: 14/523,271

(22) Filed: Oct. 24, 2014

(65) Prior Publication Data

US 2015/0211300 A1 Jul. 30, 2015

(30) Foreign Application Priority Data

Jan. 27, 2014 (AU) .............................. 2014900239
May 29, 2014 (AU) .............................. 2014902054

(51) Int. Cl.
| | | |
|---|---|---|
| *E21B 4/14* | (2006.01) | |
| *E21B 1/00* | (2006.01) | |
| *E21B 7/24* | (2006.01) | |
| *F16K 31/524* | (2006.01) | |
| *E21B 47/18* | (2012.01) | |

(52) U.S. Cl.
CPC .................. *E21B 4/14* (2013.01); *E21B 1/00* (2013.01); *E21B 7/24* (2013.01); *E21B 47/187* (2013.01); *F16K 31/52408* (2013.01)

(58) Field of Classification Search
CPC ..... E21B 4/14; E21B 7/24; E21B 1/00; E21B 47/187; E21B 7/18; E21B 21/00; F16K 31/524; F16K 31/52408; F16K 31/52433; F16K 31/5245
USPC ........... 175/57, 189, 106, 232, 317; 251/251
See application file for complete search history.

(56) References Cited

U.S. PATENT DOCUMENTS

| | | |
|---|---|---|
| 2,780,438 A | 2/1957 | Bielstein |
| 3,071,194 A | 1/1963 | Geske |
| 4,502,552 A | 3/1985 | Martini |
| 4,830,122 A | 5/1989 | Walter |
| 4,979,577 A | 12/1990 | Walter |
| 5,189,645 A | 2/1993 | Innes |
| 5,357,483 A | 10/1994 | Innes |
| 6,279,670 B1 | 8/2001 | Eddison et al. |

(Continued)

FOREIGN PATENT DOCUMENTS

WO 2015023904 A1 2/2015

OTHER PUBLICATIONS

International Search Report and Written Opinion for Application No. PCT/AU2015/000032 dated Mar. 20, 2015.

*Primary Examiner* — George Gray
(74) *Attorney, Agent, or Firm* — Lerner, David, Littenberg, Krumholz & Mentlik, LLP (57) ABSTRACT

A fluid pulse apparatus for down hole drilling having a turbine assembly actuated by a flow of drilling fluid. The apparatus has a narrowed fluid flow section that cooperates with a piston that moves between an open and a fluid flow restricting position. The apparatus has a turbine assembly that rotates in response to a flow of drilling fluid. The turbine apparatus has upper and lower cam surfaces that cooperate with fixed cam followers such that rotation of the turbine assembly and cam action between the cam surfaces and the fixed followers causes the turbine assembly to reciprocate axially. The piston is fixed to either of the upper or the lower cam surfaces such that as the turbine assembly reciprocates axially, the piston moves between the open and the flow restricting positions to create a pulsed fluid flow.

22 Claims, 9 Drawing Sheets

(56) References Cited

U.S. PATENT DOCUMENTS

| | | | |
|---|---|---|---|
| 6,364,039 | B1 | 4/2002 | Majkovic |
| 6,588,518 | B2 | 7/2003 | Eddison |
| 6,742,609 | B2 | 6/2004 | Gillis et al. |
| 6,866,104 | B2 | 3/2005 | Stoesz et al. |
| 7,077,205 | B2 | 7/2006 | Eddison |
| 7,219,726 | B2 | 5/2007 | Zheng et al. |
| 7,405,998 | B2 | 7/2008 | Webb et al. |
| 7,708,088 | B2 | 5/2010 | Allahar et al. |
| 7,878,272 | B2 | 2/2011 | Eppink |
| 8,258,649 | B2 | 9/2012 | Zyren |
| 2007/0192071 | A1 | 8/2007 | Huang et al. |
| 2009/0266612 | A1 | 10/2009 | Allahar et al. |
| 2010/0212900 | A1 | 8/2010 | Eddison et al. |
| 2010/0224412 | A1 | 9/2010 | Allahar |
| 2011/0031020 | A1 | 2/2011 | Cote |
| 2011/0073374 | A1 | 3/2011 | Bunney et al. |
| 2012/0048619 | A1 | 3/2012 | Seutter et al. |
| 2012/0073878 | A1 | 3/2012 | Zulak et al. |
| 2012/0211251 | A1 | 8/2012 | Konschuh et al. |
| 2013/0199848 | A1 | 8/2013 | Gust |
| 2013/0319767 | A1 | 12/2013 | Wilson et al. |

FLUID PULSE DRILLING TOOL

CROSS-REFERENCE TO RELATED APPLICATIONS

The present application claims priority from Australian Patent Application No. 2014900239, filed Jan. 27, 2014, and Australian Patent Application No. 2014902054, filed May 29, 2014, the disclosures of which are hereby incorporated herein by reference.

FIELD OF THE INVENTION

The present description relates to the field of providing a pressure pulse in a pipe line. In particular, the present description relates to a fluid pulse apparatus for use in down hole drilling.

BACKGROUND OF THE INVENTION

The present description specifically discusses generation of a fluid pulse in a down hole drill string. However, it will be appreciated that the concept described herein may be applicable to any fluid line where it is desirable to create a fluid pulse and no limitation is intended thereby.

In the oil and gas exploration and extraction industries, a drill string is lowered into a bore. In such operations a drilling fluid known as "mud" is pumped from the surface through the drill string to exit from nozzles at the drill bit. The mud assists in dislodging and clearing material from the cutting face and carries the dislodged material through the drill bore to the surface.

It is well known in the industry that providing a pulsed fluid flow that can create a percussive or hammer effect can improve the drilling rate. The pulse of fluid flow is generated by periodically restricting the fluid flow so as to create a pressure difference. There are many different methods that have been proposed so as to restrict fluid flow.

One principle is to provide turbines, rotors or other means that can be driven by the fluid to operate a valve that can restrict flow. Such valves have an axially reciprocating poppet or piston that can cooperate with a narrowed bore so as to control fluid flow. The reciprocating movement is operated by a cam assembly that is driven by the rotating turbine.

Two examples of such a valve arrangement are provided in U.S. Pat. No. 4,830,122. In the first example, a cam follower or followers are fixed to the upstream end of a turbine for rotation. The follower(s) is operatively associated with a cam that is fixed against rotation. A piston or valve member is mounted to the piston. The action of the cam follower(s) upon the cam causes cyclical reciprocating movement of the cam and attached piston.

U.S. Pat. No. 4,830,122 also describes an alternate embodiment in which the cam and follower assembly are at the downstream end of the turbine. The cam is fixed against rotation such the cam action that occurs upon rotation of the turbine causes the entire turbine to reciprocate axially. The piston valve member is mounted to the upstream end of the turbine for cooperation with an annular valve ring.

U.S. Pat. No. 4,830,122 also teaches that the percussive effect caused by the pulsing action of the fluid can be further enhanced by connecting the pulse apparatus to a shock tool. A shock tool is a pressure responsive device that expands and contracts in response to varying fluid pressure. Shock tools are conventionally used to isolate the drill string from axial deflections produced by the bit during drilling operations. However, when a shock tool is operatively engaged with a fluid pulse apparatus the expansion and contraction of the shock tool can provide a percussive effect at the drill bit.

Since U.S. Pat. No. 4,830,122 has been published, there have been a number of different types of fluid pulse apparatus proposed for use with or without a shock tool. Such further fluid pulse tools have arrangements including rotating plates with axial flow openings that can open and close as a rotor is driven by the fluid.

U.S. Pat. No. 6,279,670 describes a down hole fluid flow pulsing apparatus having a valve member driven by a fluid actuated positive displacement motor to provide a varying fluid flow and a shock tool responsive to the varying fluid flow. Positive displacement motors have a power section comprised of a stator and a rotor. The stator consists of a steel tube that contains a bonded elastomer insert with a lobed, helical pattern bore through the centre. The rotor is a lobed helical steel rod. When the rotor is installed in the stator, the combination of the helical shapes and lobes form sealed cavities between the two components. When drilling fluid is forced though the power section the pressure drop across the cavities will cause the rotor to turn inside the stator. The valve that is operated by the positive displacement motor has a stationary valve plate and a valve plate that is rotated by the motor. The valves each have slots that move in and out of alignment during rotation of the rotatable plate, thereby creating a variable fluid flow.

While many of the fluid flow pulse devices described in the prior art have proven to be effective at increasing drilling penetration rates they have a number of disadvantages which has prevented their widespread adoption.

It is well known and appreciated in the drilling industry that it is difficult to design down hole tools which will operate reliably under the constantly changing properties of drilling mud and the constantly increasing hydrostatic pressure at down hole locations. This problem is exacerbated by the small space within which down hole tools must fit. In many drilling situations the down hole tools have an outside diameter of only 4¾ inches. These dimensional restraints impose onerous constraints on the design of such tools.

Further, many down hole tools have polymeric seals or elastomers. Such materials are subject to wear, abrasion by particles in the drilling fluid and can only be operated within certain temperature ranges and cannot be used with non-aqueous chemicals.

Despite the numerous prior art arrangements, there is constant desire in the oil and gas industry to provide fluid pulse apparatus that are cost effective to manufacture whilst being sufficiently robust to withstand the significant adverse operating conditions with minimal maintenance and associated down time. It will be appreciated that drill string downtime can have significant economic disadvantages.

It is therefore an object of the present disclosure to provide an alternative fluid pulse apparatus.

BRIEF SUMMARY OF THE INVENTION

According to one aspect, there is disclosed a fluid pulse apparatus adapted to be connected to a pipe line, the apparatus comprising a housing defining a fluid flow passage for a flow of fluid from an upstream end towards a downstream end; a turbine assembly within the fluid flow passage, the turbine assembly having an upstream annular cam surface and a downstream annular cam surface; at least one turbine member that is operatively connected to the upstream annular cam surface and the downstream annular cam surface and that is actuated by a flow of drilling fluid in the fluid flow passage so as to cause rotation turbine assembly; a piston fixed to the upstream annular cam surface or the downstream annular cam surface; the fluid flow passage has a narrowed fluid flow passage section located upstream of the turbine assembly when the piston is fixed to the upstream annular can surface such that the piston is receivable within the narrowed fluid flow passage or the narrowed fluid flow passage is located downstream of the turbine assembly when the piston is fixed to the upstream annular can surface such that the piston is receivable within the narrowed fluid flow passage; at least one upstream cam follower fixed to the housing for cooperation with the upstream annular cam surface and at least one downstream cam follower fixed to the housing for cooperation with the downstream annular cam surface; such that when the turbine assembly is caused to rotate, there is a cam action between the upstream follower(s) and the upstream annular cam surface and between the downstream cam follower(s) and the downstream annular cam surface that causes the turbine assembly to reciprocate axially within the fluid flow passage such that the piston moves between a flow restricting position within the narrowed fluid flow passage and an open position to effect periodic flow restriction of the flow of fluid through the fluid flow passage.

The apparatus may be adapted for connection to any suitable pipe line. Suitably, the apparatus is for connection to a drill string for down hole drilling.

The fluid flow passage has a narrowed fluid flow passage section. The narrowed fluid flow passage section is suitably in the form of a plate with an aperture or orifice.

Suitably the narrowed fluid flow passage defines a venturi.

The narrowed fluid flow passage section can be either upstream or downstream of the turbine assembly. As the piston is receivable within the narrowed fluid flow passage, it follows that if the narrowed fluid flow passage is at the upstream end, the piston is fixed to the upstream annular cam surface and vice versa.

Suitably, the piston is fixed to upstream annular cam surface which means that the piston moves upwards towards the flow restricting position and downwards towards the open position. In this case, if any debris or other particles in the fluid becomes jammed between the piston and the narrowed fluid flow passage section, the piston may be forced downwards into the open position due to the reduced flow to the turbine assembly and the downward hydraulic force on the piston. The forced downward movement of the piston would allow for the debris to clear so as the apparatus may continue to function.

On the other hand, if the piston is fixed to the downstream annular cam surface the piston moves downwards towards the fluid flow restricting position and upwards towards the open position. In this case, if there is any debris or other particles in the fluid, the piston may become jammed in the flow restricting position due to debris becoming caught between the piston and the narrowed fluid flow passage section. Unlike the situation above, the downward forces continue to force the piston into the jammed position instead of towards the open position. Such jamming may stop the tool from functioning.

Further, when the piston is fixed to the upstream annular cam surface the fluid flow into the turbine assembly is controlled. When the piston is fixed to the downstream annular cam surface the fluid flow out of the turbine assembly is controlled. Flow control into the turbine assembly may be advantageous as this may alleviate pressure build up within the turbine assembly and exposes the turbine member to less adverse forces.

Suitably, the relative dimensions of the piston and the narrowed fluid flow passage are such that the piston cannot fully close the narrowed fluid flow passage section. A complete closure of the fluid flow may cause the turbine assembly to stall.

Suitably where the narrowed fluid flow passage section includes a plate or valve ring, the plate or valve ring are adapted for easy removal and replacement with a plate or valve ring with an orifice of a different size. In this way, the dimensions of the narrowed fluid flow passage section may be tuned for different conditions such as fluid weight and viscosity.

In addition to, or alternatively, the piston may be adapted for replacement with a piston of different dimensions.

The apparatus has a turbine assembly that includes at least one turbine member. The at least one turbine member may be any suitable configuration, known in the turbine arts, such as a screw, rotor or the like that can be caused to rotate axially in response to fluid flow. The at least one turbine member is actuated by the flow of drilling fluid through the fluid flow passage.

Suitably the at least one turbine member is a screw such as an Archimedes screw.

The turbine member is operatively connected to the upstream annular cam surface and the and downstream annular cam surfaces such that the respective annular cam members rotate with rotation of the turbine assembly. Such operative connection may be by any suitable means.

Suitably, outer edges of the turbine member(s) are fixed to a turbine sleeve such that the sleeve rotates with the turbine member(s). Such an arrangement is known in the turbine arts. An advantage of having the turbine members fixed to the sleeve is that the sleeve ends can define the annular cam surfaces which can avoid or limit the need for seals, bearings, locating shafts and the like.

Suitably where the turbine assembly includes a turbine sleeve, the turbine assembly does not include a central shaft.

Alternatively, the turbine member(s) may be fixed to a shaft and the respective cam surfaces may be fixed to the ends of the shaft.

The present inventor's use of rotating cams acting on fixed followers is opposite to the arrangement described in U.S. Pat. No. 4,830,122 in which the cams are fixed against rotation and the followers rotate. In the embodiment of U.S. Pat. No. 4,830,122 when the piston is fixed to the cam, the piston does not rotate. In the apparatus as described herein, because the piston is attached to the cam, the piston rotates. A surprising and unexpected advantage of the rotating piston is that the rotating movement can disperse or cut through any dirt or debris in the fluid that may potentially block the narrowed fluid flow section.

Upstream and downstream cam followers are fixed to the housing for cooperation with the respective upstream and downstream cam surfaces. Suitably, the cam followers are designed so as to apply a symmetrical force to each cam surface.

As the cam follower are fixed and the cam surfaces rotate, the cam action between the rotating cams and fixed followers causes reciprocating axial movement to be transferred to the entire turbine assembly causing the turbine assembly to reciprocate axially.

A pulse generating arrangement described in U.S. Pat. No. 4,830,122 also employs axial movement of the turbine assembly. However, this is achieved using a downstream rotating follower operating against a fixed cam. The upwards motion of the turbine is positively caused by the contact between the cam and follower and the return movement is as a result of gravity. This can generate undesirable shock and instability. It will be appreciated that these forces can be considerable under normal drilling operations in which fluid flow rate can vary significantly for example between 200 gallons per minute and 450 gallons per minute, the pressure may be between 100 psi and 1500 psi and the flow restriction may operate between open and flow restricted positions between about 1 and 3 pulses per second. It will be appreciated that for some applications, the fluid flow rate, pressure and/or periodic restriction cycles can fall outside these ranges.

However, the present inventor has surprisingly and unexpectedly discovered that such axial instability can be at least partially ameliorated by providing a turbine assembly with an upstream annular cam surface at the upstream turbine assembly end in combination with a downstream annular cam surface at the downstream end of the turbine assembly. The cam action of the upstream annular cam assembly and upstream fixed cam follower(s) positively returns the turbine assembly to the lowest position rather than relying on gravity. The interaction between the upstream and downstream cams provides a very smooth reciprocating movement of the turbine assembly in which the turbine assembly is always subject to a positive axial force in both directions.

Such smooth reciprocating movement reduces or minimizes lateral vibration. Lateral vibration can cause damage to other components within the tool itself or other components within the drill string.

The cam profiles can be designed so as to provide one or more pulses for each revolution of the turbine assembly.

The apparatus may be used in a drill string conjunction with a pressure pulse responsive device such as a shock tool that can expand or contract in response to the fluid pressure variation to create axial movement of the drill string.

According to a further aspect, there is described an assembly for delivering a percussive effect in a down hole drill string; the assembly including a fluid pulse apparatus as described in the first aspect and a fluid actuated pressure pulse response device that is actuated in response to the fluid pulse generated by the fluid pulse apparatus.

The pressure pulse apparatus may be placed either upstream or downstream of the fluid pulse apparatus.

According to a further aspect of the invention, there is provided a method of drilling comprising operatively connecting a fluid pulse apparatus as described in the first aspect to a drill string and operating said drill string in a down hole mode.

DETAILED DESCRIPTION

In describing embodiments of the invention discussed herein, specific terminology will be used for the sake of clarity. However, the invention is not intended to be limited to any specific terms used herein, and it is to be understood that each specific term includes all technical equivalents, which operate in a similar manner to accomplish a similar purpose.

Figure 1:
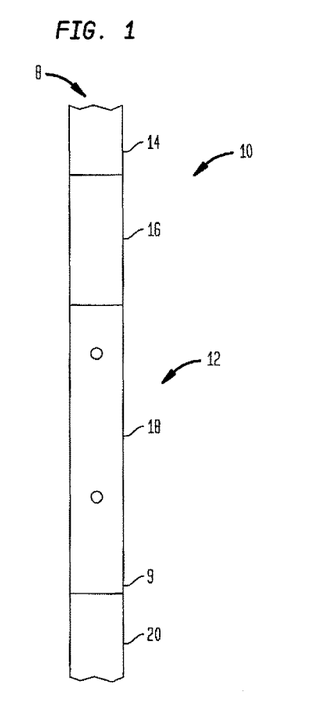
FIG. 1 is a schematic view of the lower end of a drill string.

FIG. 1 is a schematic view of the lower end of a drill string 10 that includes a fluid pulse apparatus 12 of the present invention. The drill string 10 includes a conventional drill string component 14 that may be a drill collar, a drill pipe, a down hole mud motor or a measurement while drilling tool or a shock tool.

The fluid pulse apparatus 12 comprises a housing with an upper sub 16 connected to a lower main body sub 18. The housing defines a fluid flow passage for a flow of drilling fluid from an upstream end towards a downstream end 7.

The main body sub 18 is connected to a lower drill string component 20 that can also be any conventional down hole drilling component such as that may be a drill collar, a drill pipe, a down hole mud motor, shock tool or a measurement while drilling tool but not limited to.

Figure 2:
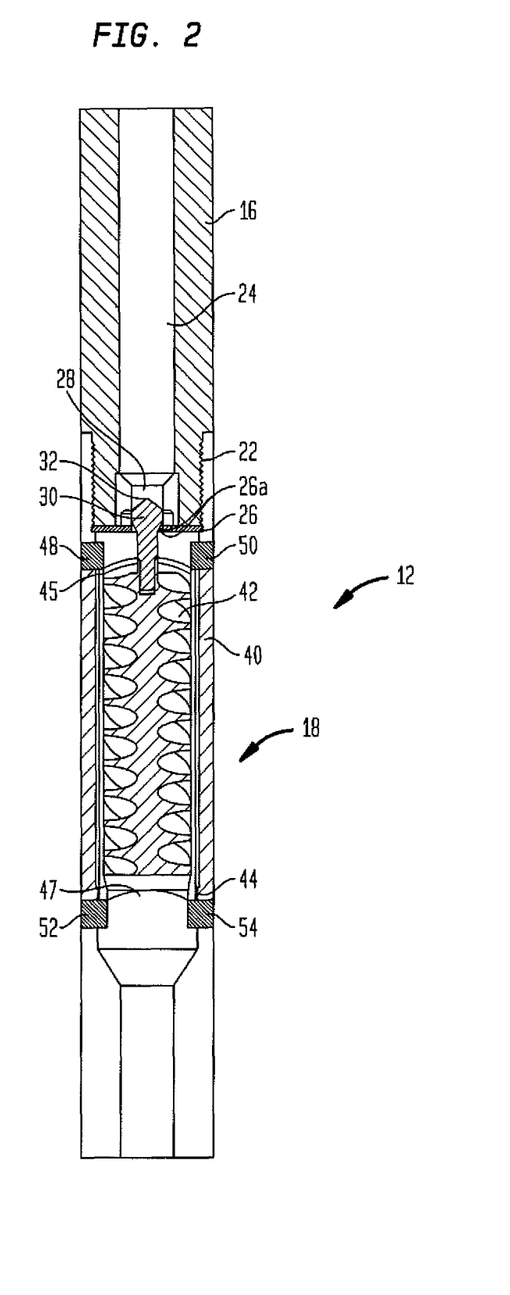
FIG. 2 is a schematic cross sectional view of an apparatus of one aspect.
Figure 3:
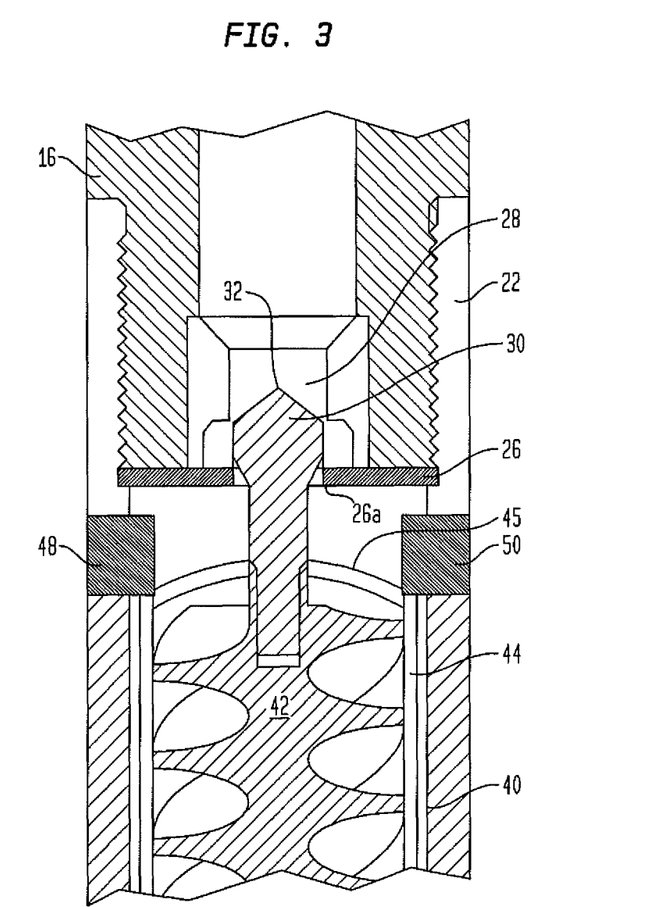
FIG. 3 is a schematic cross section of the upper section of the aspect shown in FIG. 2.
Figure 4:
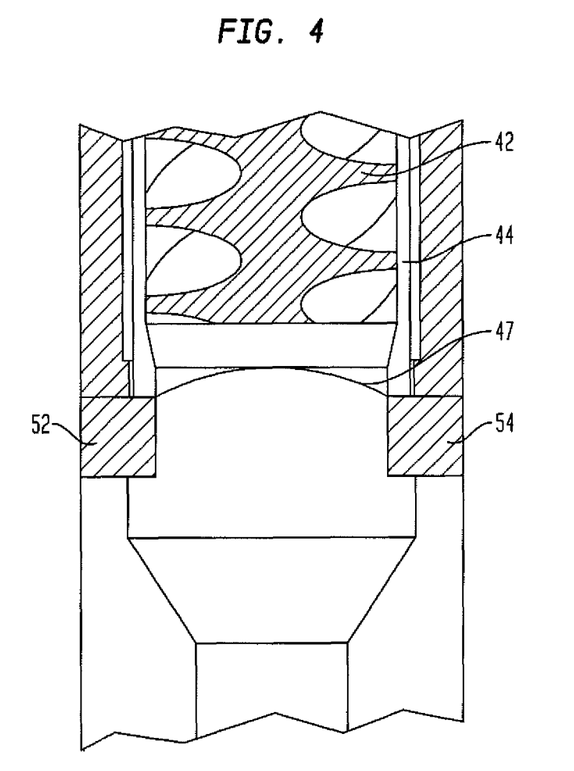
FIG. 4 is a schematic cross section of the lower section of the aspect shown in FIG. 2

FIG. 2 shows a schematic cross section of the fluid pulse apparatus 12, with FIGS. 3 and 4 showing details of the upper and lower sections respectively.

The upper sub 16 is connected to the lower main sub 18 through threaded connection 22. The upper sub 16 has a bore 24 defining a fluid flow passage. A bore restriction or narrowed fluid flow section 28 is located at the downstream end of the bore 24.

An orifice plate 26 inserted into the downstream end of the connection 22 downstream of the bore restriction 28.

Figure 5A:
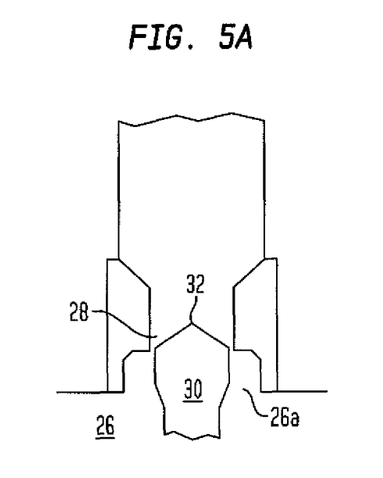
FIG. 5a is a schematic of the piston in the closed position.
Figure 5B:
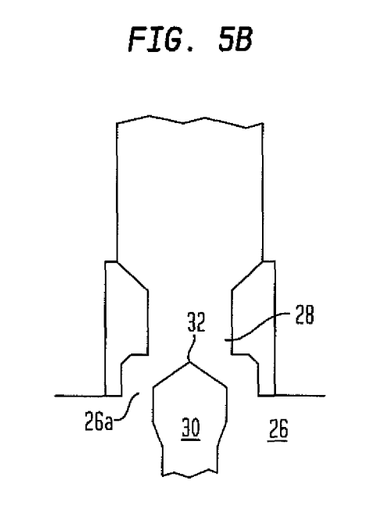
FIG. 5b is a schematic view of the piston in the open position.

FIGS. 2 and 3 show that the flow from the bore restriction 28 through the orifice 26a of the orifice plate 26 is restricted by the head 30 of a piston 32. The piston 32 is moveable between an open position (shown in detail in FIG. 5b) in which there is no fluid flow restriction through the bore restriction 28 and a fluid restricting position (shown in detail in FIG. 5a). As can be seen in FIG. 5a, the fluid flow is not restricted completely as this will cause the turbine to stall, as will be discussed further below.

The orifice plate 26 can be readily replaced with a plate having a different sized orifice. In this way, the apparatus can be adapted for different flow rates, fluid types and mud types.

The head 30 of the piston 32 piston is designed to have a taper so as to reduce the downward hydraulic force exerted on the piston 30 so as to reduce the torque required for rotation of the turbine.

The tapered shape of the piston also reduces turbulent flow across the piston so as to achieve a stable and predictable pulse.

The main body sub 18 has a radial bushing 40 pressed into the inner diameter. A shaft less helical screw or Archimedes screw 42 is mounted within the main body sub 18 for rotation.

Archimedes screws are known to be able to operate under very low heads, are simple in construction, reliable and can tolerate debris. They can also tolerate low fluid levels. This means that an Archimedes screw may still be able to rotate under fluid flows where other types of turbine may stall. This means that the tolerance of the flow restriction may be as small as possible. The smallest possible clearance is desirable so as to maximize the water hammer effect. However, if the clearance restricts the flow completely or too much, the turbine can stall.

The turbine can be adjusted in pitch of the turbine blades so that RPM of the turbine can be tailored to the amount of fluid pumped through it. In one example, a fluid flow of 400 gallons per minute will produce 1100 RPM but with the turbine pitch adjusted, 250 gallons per minute will produce 1100 RPM but not limited to. The RPM of the turbine is directly related to the frequency of pulse required.

The outer edges of the screw 42 are fixed to a turbine sleeve 44. The turbine sleeve 44 is fitted into the bushing 40 with a clearance.

The upstream and downstream ends of the turbine sleeve 44 are defined by respective cam surfaces 45, 47. The cam surfaces 45, 47 have orifices/apertures defining fluid inlets and outlets into the screw 42.

Opposed pairs of cam pin followers 48, 50; 52, 54 are threaded through the outer walls of the main body and project inwardly into the main body sub 18.

The upper and lower cam surfaces 45, 47 are in contact with the cam follower pins 48, 50; 52, 54 and the sleeve 44 is thereby supported by the lower cam follower pins 52, 54.

In use the fluid flows into the main sub body 18 and causes the screw 42 to rotate as per conventional pulse tools. However, contrary to conventional tools, the present apparatus includes upper and lower cam surfaces that rotate with the turbine.

The cam action of the rotating cam surfaces 45, 47 on the fixed followers causes 48, 50; 52, 54 the screw 42 and turbine sleeve 44 to reciprocate axially and the whole turbine assembly is alternatively positively pushed upwards by the lower cam action and positively pushed downwards by the upper cam action.

Such positive action in both directions imparts a high degree of axial stability to the reciprocating movement. The result is an increase in reliability and tolerance to working angles, varying fluid flows and the like.

The cam profiles can be adjusted so as to adjust the overall axial movement of the piston. This could be from 1 mm movement through to 50 mm movement but not limited to. This adjustment can then be used to tune the apparatus so as to achieve a fluid pulse under different conditions.

Figure 6:
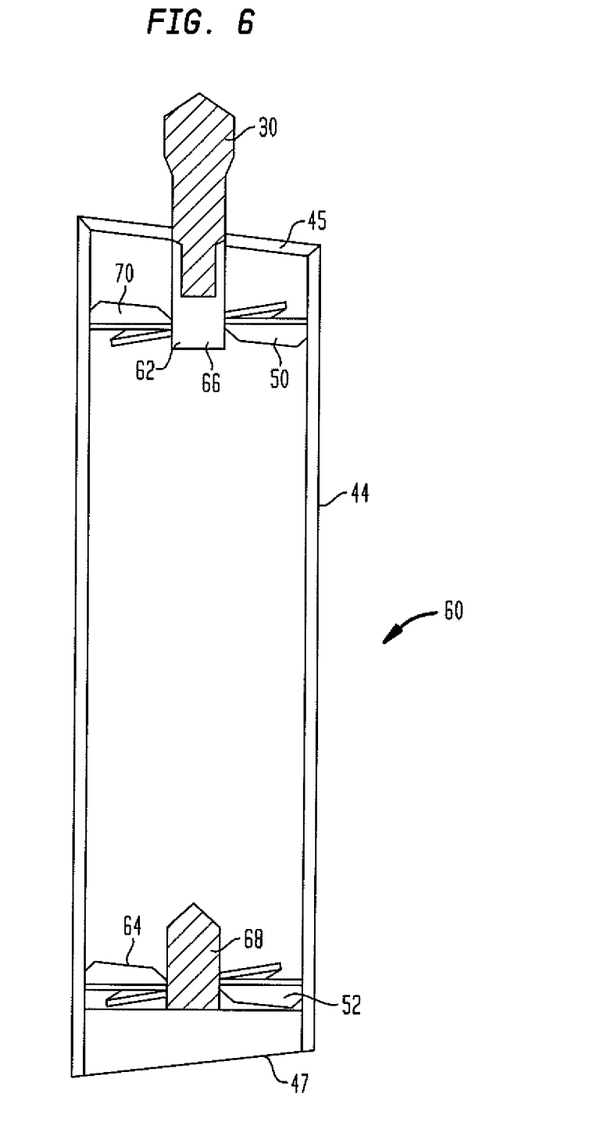
FIG. 6 is a schematic cross section of the lower section of the aspect shown in FIG. 2.

FIG. 6 shows a schematic view of an alternative main body sub 60. The same features are those discussed above are identified by the same reference numerals. The main body sub 60 has upstream and downstream Kaplan turbines 62, 64.

Each turbine 62, 64 has a shaft 66, 68 upon which helical blades 70 are mounted. The blades are fixed to a turbine sleeve 44.

Each shaft 66, 68 is mounted to a cam surface 45, 47. The upper shaft 66 is fixed to a piston 32.

In use, the fluid passes from the upstream end to the downstream end, the turbines 62, 64 are caused to rotate in response to the fluid flow, thereby causing rotation of the turbine sleeve and cams 45, 47 in the same manner as discussed above with respect to FIGS. 1-5.

Figure 7:
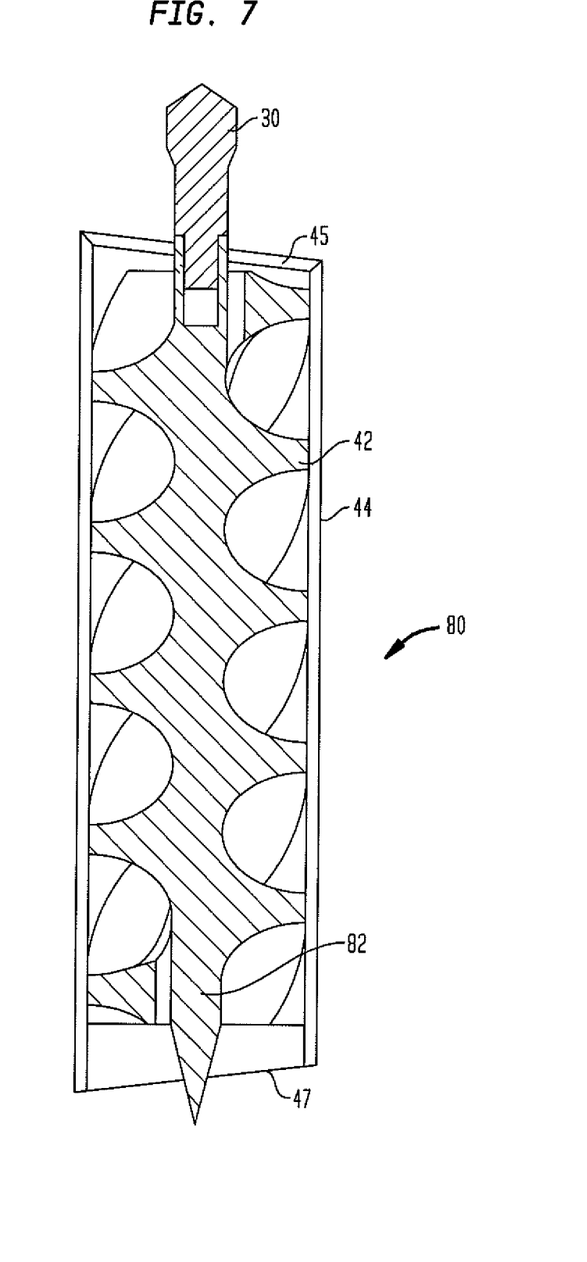
FIG. 7 is a schematic cross sectional view of an apparatus of another aspect.

FIG. 7 shows a further aspect of a main sub body 80. The body 80 is similar to that describe above with respect to FIGS. 1 to 5 in having an Archimedes screw 42 attached to a turbine sleeve 44. Upstream and downstream cams 45, 47 are attached to the turbine sleeve 44. In this case, the screw 40 has a shaft 82.

Figure 8:
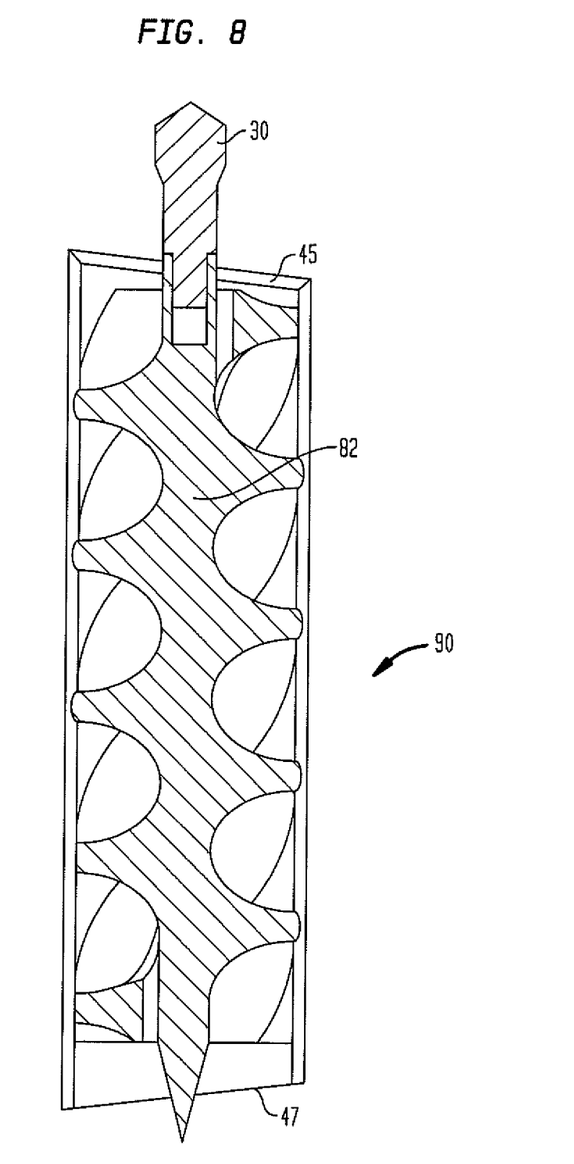
FIG. 8 is a schematic cross sectional view of an apparatus of a further aspect.

FIG. 8 shows a still further aspect of the main body sub 90. The main body sub is similar to that shown in FIG. 8 except that there is no turbine sleeve. The shaft is fixed to the cam surfaces 45, 47 and the cam surfaces are caused to rotate by rotation of the shaft rather than a turbine sleeve.

Figure 9:
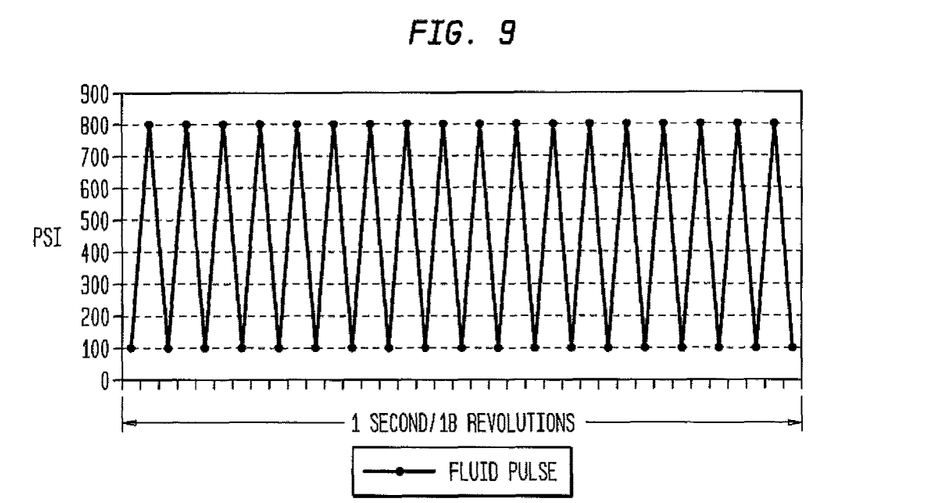
FIG. 9 is a graph showing pulse pressure as a function of time as generated by an apparatus of the present disclosure.

FIG. 9 is a graph showing pulses per second at 700 psi that are created over one second by a fluid pulsing apparatus of the invention pumping 300 gallons per minute. There are 18 revolutions of the turbine apparatus per second and 18 pulses, representing one pulse per revolution.

Figure 10:
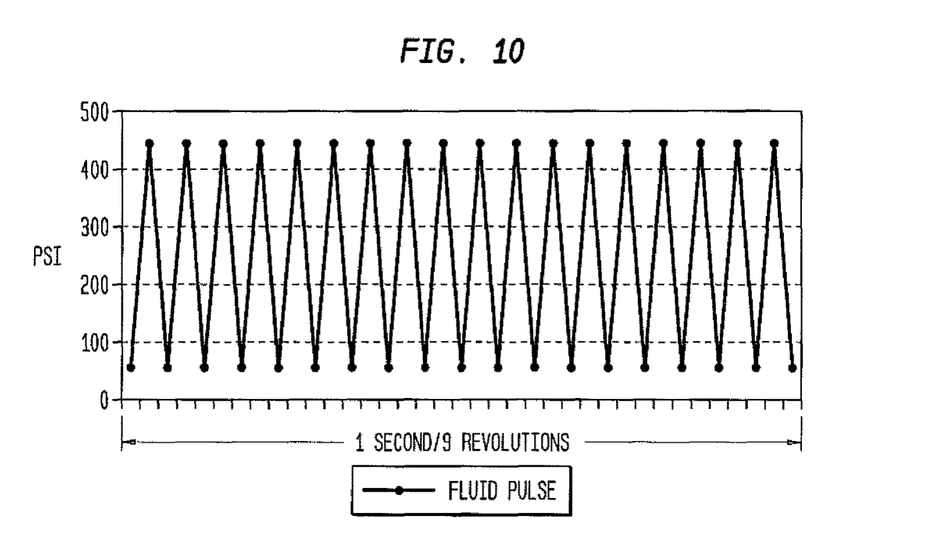
FIG. 10 is a further graph showing pulse pressure as a function of time generated by an alternate configuration of an apparatus of the present disclosure.

FIG. 10 is a graph of showing pulses per second at 400 psi that are created over one second by the same fluid pulsing apparatus as that used to generate the graph of FIG. 9, also pumping 300 gallons per minute. There are 9 revolutions of the turbine apparatus per second and 18 pulses, representing one pulse per revolution.

The fluid pulses may be seen to be very consistent in frequency and pulse height. This makes the pulses that this tool creates very easy to filter out so that the pulses do not interfere with other tools such as directional tools and (measurement while drilling) MWD tools.

As discussed above, the maximum fluid pressure is achieved when the piston is in the fluid restricting position. The narrower the restriction, the greater the increase in pressure. The graph of FIG. 10 was achieved with a piston of smaller diameter than that used to generate the graph in FIG. 9. It will be appreciated that by simply changing the piston and/or orifice diameter, the fluid pulse apparatus of the present invention can be easily tuned.

Further adjustments may be made by adjusting the pitch of the turbine and size of the piston while using different fluid property and pumping different gallons per minute, it is possible to adjust the frequency of pulse over a second and to adjust the pulse height to create many different configurations tailored to match different conditions.

The fluid pulse apparatus does not have any roller bearings or elastomers, such as those found in positive displacement motors that are used to drive valves to produce a pressure pulse as per known devices. The lack of roller bearings and elastomers can extend the life of the apparatus while being used in hot hole conditions and when there is abrasive matter being pumped through the apparatus.

Still further without elastomers, non-aqueous chemical fluids can be pumped through the apparatus.

Further, without elastomers or seals, the apparatus can tolerate higher pressures.

As a result of the double cam action, the fluid pulses are very consistent in frequency and pulse height. It is believed that this consistency is as a result of the as a result of the double cam action. This makes the pulses that this tool creates very easy to filter out so that the pulses do not interfere with other tools such as directional tools and (measurement while drilling) MWD tools.

Unlike other fluid pulse apparatus on the market, the flow control components of the present apparatus only move axially. This in turn means that there is no harmful and unwanted lateral vibration created. Those apparatus on the market that use mud motor technology do create lateral vibration that in turn causes damage to other components that make up and are included within the drill string.

The present fluid pulse apparatus can be used with or without a shock tool. An advantage of the present apparatus is that the apparatus without a shock tool can induce a hammer effect on coil tubing which in turn creates axial movement of a drill string.

When the fluid pulse apparatus is used with a shock tool the pulse will react on the pump open area of the shock tool. This will cause the shock tool to axially extend and retract with each pulse. The shock tool can be placed below the fluid pulse apparatus or above the fluid pulse apparatus. If the pump open area of the shock tool is increased, the pulse will have a larger area for the hydraulic force to act upon which in turn will increase the axial extend and retract the shock tool. If the pump open area of the shock tool is reduced, the pulse will have less area for the hydraulic force to act upon which in turn will reduce the axial extend and retract the shock tool. This is known as a hammer effect as described in U.S. Pat. No. 4,830,122.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will also be appreciated that the various dependent claims and the features set forth therein can be combined in different ways than presented in the initial claims. It will also be appreciated that the features described in connection with individual embodiments may be shared with others of the described embodiments.

The invention claimed is:

1. A fluid pulse apparatus for down hole drilling, comprising:
    a housing defining a fluid flow passage for a flow of drilling fluid from an upstream end towards a downstream end;
    a turbine assembly within the fluid flow passage, the turbine assembly having an upstream annular cam surface, a downstream annular cam surface and a longitudinal axis extending between the upstream annular cam surface and the downstream annular cam surface;
    at least one turbine member that is operatively connected to the upstream annular cam surface and the downstream annular cam surface and is actuated by the flow of drilling fluid so as to cause rotation of the turbine assembly; and
    a piston fixed to the upstream annular cam surface;
    the fluid flow passage having a narrowed fluid flow passage upstream of the turbine assembly such that the piston is receivable within the narrowed fluid flow passage;
    at least one upstream cam follower fixed to the housing for cooperation with the upstream annular cam surface and at least one downstream cam follower fixed to the housing for cooperation with the downstream annular cam surface;
    such that when the turbine assembly is caused to rotate, there is a cam action between the upstream cam follower(s) and the upstream annular cam surface and between the downstream cam follower(s) and the downstream annular cam surface that causes the turbine assembly to reciprocate axially along the longitudinal axis within the fluid flow passage such that the piston moves axially along the longitudinal axis between a flow restricting position within the narrowed fluid flow passage and an open position to effect periodic restriction of the flow of drilling fluid through the fluid flow passage.

2. The apparatus of claim 1, wherein there is a single turbine member that is an Archimedes screw.

3. The apparatus of claim 1, wherein the turbine assembly includes a turbine sleeve and outer edges of the at least one turbine blade member(s) are fixed to the turbine.

4. The apparatus of claim 3, wherein the turbine assembly does not include a central shaft.

5. The apparatus claim 1, wherein the turbine assembly includes a shaft and the respective cam surfaces are fixed to opposing ends of the shaft.

6. The apparatus of claim 1, wherein a symmetrical cam force is applied to the upstream annular cam surface by the at least one upstream follower and a symmetrical cam force is applied to the downstream annular cam surface by the at least one downstream follower.

7. The apparatus of claim 1, wherein the narrowed fluid flow passage includes a plate with an orifice.

8. The apparatus of claim 7, wherein the plate is adapted to be removed and replaced with a plate with an orifice of a different size.

9. The apparatus of claim 1, wherein the piston is adapted for replacement with a piston of different dimensions.

10. The apparatus of claim 1, wherein the piston has a tapered head.

11. A fluid pulse drilling tool for down hole drilling comprising the fluid pulse apparatus of claim 1.

12. An assembly for delivering a percussive effect in a down hole drill string, the assembly including the fluid pulse apparatus of claim 1 and a fluid actuated pressure pulse response device that is actuated in response to the fluid pulse generated by the fluid pulse apparatus.

13. The assembly of claim 12, wherein the fluid actuated pressure pulse responsive device is located upstream of the fluid pulse apparatus.

14. The assembly of claim 12, wherein the fluid actuated pressure pulse responsive device is located downstream of the fluid pulse apparatus.

15. A method of drilling comprising operatively connecting the assembly claim 12 to a drill string and operating said drill string in a down hole mode.

16. A method of drilling comprising operatively connecting the fluid pulse apparatus of claim 1 to a drill string and operating said drill string in a down hole mode.

17. A fluid pulse apparatus adapted to be connected to a pipe line, the apparatus comprising:
    a housing defining a fluid flow passage for a flow of fluid from an upstream end towards a downstream end;
    a turbine assembly within the fluid flow passage, the turbine assembly having an upstream annular cam surface, a downstream annular cam surface and a longitudinal axis extending between the upstream annular cam surface and the downstream annular cam surface;
    at least one turbine member that is operatively connected to the upstream annular cam surface and the downstream annular cam surface and that is actuated by a flow of drilling fluid in the fluid flow passage so as to cause rotation of the turbine assembly; and
    a piston fixed to the upstream annular cam surface or the downstream annular cam surface;

the fluid flow passage having a narrowed fluid flow passage section located upstream of the turbine assembly when the piston is fixed to the upstream annular cam surface such that the piston is receivable within the narrowed fluid flow passage, or the narrowed fluid flow passage is located downstream of the turbine assembly when the piston is fixed to the upstream annular cam surface such that the piston is receivable within the narrowed fluid flow passage;

at least one upstream cam follower fixed to the housing for cooperation with the upstream annular cam surface and at least one downstream cam follower fixed to the housing for cooperation with the downstream annular cam surface;

such that when the turbine assembly is caused to rotate, there is a cam action between the upstream follower(s) and the upstream annular cam surface and between the downstream cam follower(s) and the downstream annular cam surface that causes the turbine assembly to reciprocate axially along the longitudinal axis within the fluid flow passage such that the piston moves between a flow restricting position within the narrowed fluid flow passage and an open position to effect periodic flow restriction of the flow of fluid through the fluid flow.

18. A turbine assembly configured to be mounted within the fluid flow passage of the fluid pulse apparatus of claim 17, the turbine assembly comprising;
   a turbine sleeve having an upstream end and a downstream end;
   an upper annular cam surface operatively connected to the upstream end and a lower annular cam surface operatively connected to the downstream end; and
   a turbine screw member fixed within the turbine sleeve such that rotation of the turbine screw member causes rotation of the turbine sleeve and also rotation of the upper cam surface and the lower cam surface.

19. The turbine assembly of claim 18, wherein the screw is an Archimedes screw.

20. The turbine assembly of claim 19, wherein the Archimedes screw does not have a shaft and the outer edges of the screw are fixed to the turbine sleeve.

21. The turbine assembly of claim 20, wherein the upper cam surface is defined by the upstream end of the turbine sleeve and the lower cam surface is defined by the downstream end of the turbine sleeve.

22. The turbine assembly of claim 18 further comprising a piston fixed to the upper cam surface.

* * * * *